US012093541B1

(12) United States Patent
Mathews et al.

(10) Patent No.: US 12,093,541 B1
(45) Date of Patent: Sep. 17, 2024

(54) TEMPERATURE-BASED BANDWIDTH COMPENSATION FOR MEMORY TRAFFIC

(71) Applicant: Apple Inc., Cupertino, CA (US)

(72) Inventors: Gregory S. Mathews, Saratoga, CA (US); Jeonghee Shin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 17/929,925

(22) Filed: Sep. 6, 2022

(51) Int. Cl.
*G06F 3/06* (2006.01)

(52) U.S. Cl.
CPC .......... *G06F 3/0631* (2013.01); *G06F 3/0611* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,640,242 B1 | 5/2017 | Lo et al. | |
| 9,841,926 B2 | 12/2017 | Fleischer et al. | |
| 10,936,044 B2 | 3/2021 | Bacchus et al. | |
| 2012/0072677 A1* | 3/2012 | Biswas | G06F 13/18 711/149 |
| 2014/0304444 A1* | 10/2014 | Walker | G06F 9/5094 711/170 |
| 2017/0249091 A1* | 8/2017 | Hodes | G06F 1/3296 |
| 2019/0107871 A1* | 4/2019 | Sundaram | G06F 1/206 |
| 2020/0021492 A1* | 1/2020 | Ganguli | G06F 3/061 |
| 2020/0371699 A1* | 11/2020 | Paulraj | G06F 3/0673 |
| 2021/0141564 A1 | 5/2021 | Shin | |
| 2021/0397232 A1 | 12/2021 | Nowell et al. | |
| 2022/0197563 A1* | 6/2022 | Lam | G06F 3/0659 |
| 2022/0255874 A1* | 8/2022 | Losee | H04L 49/40 |
| 2023/0197175 A1* | 6/2023 | Prakash | G11C 29/028 365/185.22 |
| 2023/0305906 A1* | 9/2023 | Zaykov | G06F 9/4893 |

\* cited by examiner

*Primary Examiner* — Tasnima Matin
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to bandwidth compensation for certain memory traffic at high temperatures. In some embodiments, processor circuitry is configured to execute memory access operations for multiple traffic classes, including a first traffic class (e.g., real-time traffic) associated with a bandwidth quality-of-service parameter and a second traffic class (e.g., low-latency traffic). In some embodiments, memory controller circuitry is configured to access storage circuitry to perform the memory access operations, determine a temperature value associated with the storage circuitry, and, based on detection of a first temperature scenario for the storage circuitry, allocate memory access operations among the first and second traffic class according to a first allocation policy. In some embodiments, in response to detection of a second temperature scenario for the storage circuitry, memory controller circuitry allocates memory access operations among both traffic classes according to a second allocation policy. The second allocation policy may provide greater bandwidth for the first class than the first allocation policy.

20 Claims, 7 Drawing Sheets

US 12,093,541 B1

TEMPERATURE-BASED BANDWIDTH COMPENSATION FOR MEMORY TRAFFIC

TECHNICAL FIELD

This disclosure relates generally to memory controller circuitry and more particularly to quality-of-service control at high memory temperatures.

Description of the Related Art

Generally, the temperature of storage circuitry (e.g., dynamic random-access memory (DRAM)) may vary under different workloads, operating frequencies, activity level of other components, etc. As DRAM temperatures increase, the refresh rate may increase to properly retain stored data. Increasing the refresh rate may have substantial impact on available bandwidth.

DETAILED DESCRIPTION

DRAM temperature may increase due to various reasons, including servicing heavy workloads, operating at a higher frequency, operating in a hot environment, etc. High temperatures may cause interconnect wires to become more resistive or change the characteristics of internal drivers, which in turn may cause the time to drive values into memory cells to increase. In addition, high temperatures may cause capacitive cells to discharge at a faster rate. In such situations, increasing the refresh rate of DRAM may mitigate at least some of these issues but may negatively impact available bandwidth.

While bandwidth loss due to high temperature may not be recoverable, mitigating the impact on the quality-of-service for one or more virtual channels may be desirable. In some embodiments, a memory controller and communication fabric support multiple classes of traffic, where the classes are assigned to various virtual channels. Generally speaking, a real-time (RT) traffic class may have a bandwidth quality-of-service priority while a low-latency traffic (LLT) class may have a latency quality-of-service priority. In disclosed embodiments, control circuitry may mitigate bandwidth loss due to temperature for one or more virtual channels (e.g., at the expense of other channels). For example, control circuitry may more heavily prioritize real-time traffic in high-temperature scenarios.

In some embodiments, discussed in detail below, memory controller circuitry is configured to switch bandwidth allocation policies for arbitrating among traffic classes based on detecting various temperature scenarios, frequency scenarios, or both.

Disclosed techniques may advantageously mitigate quality-of-service impacts of high temperature by allocating additional bandwidth to real-time traffic.

Overview of Memory Controller Circuitry

Figure 1:
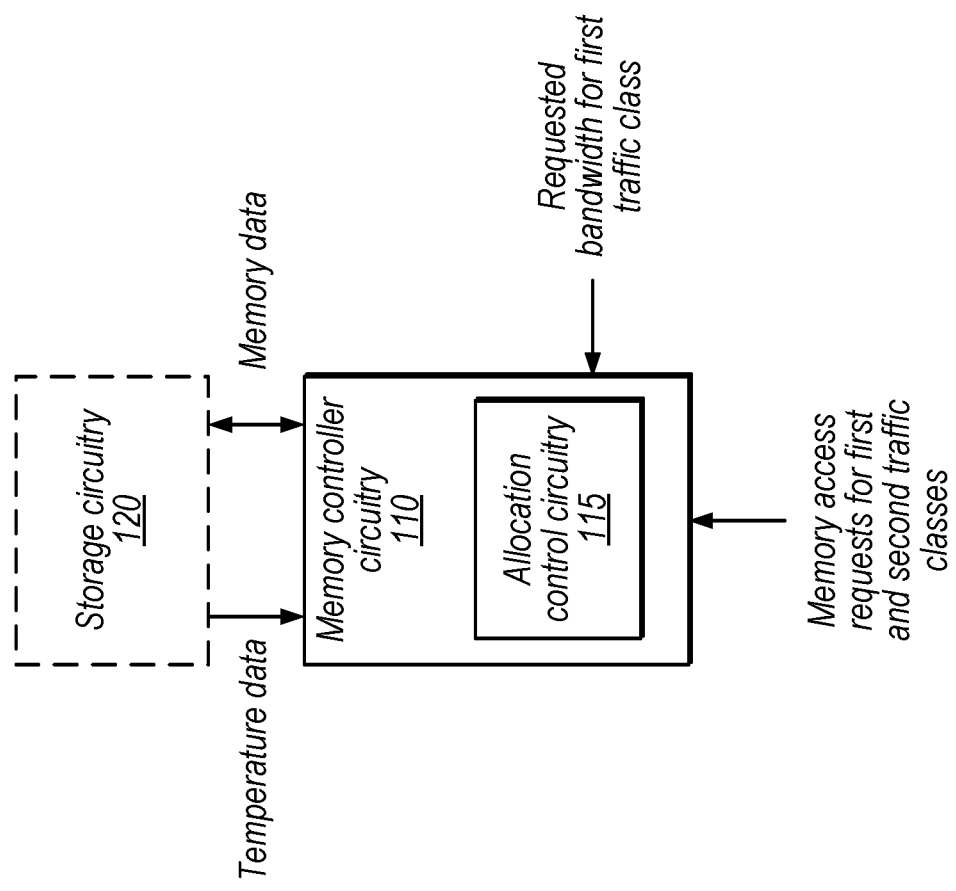
FIG. 1 is a block diagram illustrating an overview of example memory controller circuitry, according to some embodiments.

FIG. 1 is a block diagram illustrating an overview of example memory controller circuitry, according to some embodiments. In the illustrated embodiment, a device includes memory controller circuitry 110 and storage circuitry 120. Memory controller circuitry 110, in turn, includes allocation control circuitry 115.

Memory controller circuitry 110, in the illustrated embodiment, receives memory access requests via multiple virtual channels. Note that virtual channels may be logically separate while sharing some hardware resources (e.g., fabric switches), but may also have other dedicated hardware resources (e.g., per-virtual-channel buffer circuitry). In some embodiments, the virtual channels carry different traffic classes and have different quality of service requirements. Requests from certain agent circuits may be sent via a particular virtual channel, or an agent circuit may be configured to send requests via multiple different virtual channels. In some embodiments, discussed in further detail below, the virtual channels include a real-time (RT) channel, a low-latency latency traffic (LLT) channel, and a bulk (or best-effort) channel.

In some embodiments, memory controller circuitry 110 is configured to receive a temperature value from storage circuitry 120, memory access requests for first and second traffic classes, memory data from storage circuitry 120 (if the memory access requests are reads), memory data to be sent to storage circuitry 120 (if the memory access requests are writes), and requested bandwidth for the first traffic class. In some embodiments, the first traffic class corresponds to real-time traffic and the second traffic class corresponds to low-latency traffic, for example.

In some embodiments, RT traffic may generally have a bandwidth quality-of-service priority, while LLT may generally have a latency quality-of-service priority. Control circuitry may provide resources to a traffic class with a bandwidth quality-of-service priority over other traffic classes when that class is not receiving (or at risk of not receiving) its requested bandwidth. Similarly, control circuitry may provide resources to a traffic class with a latency quality-of-service priority over other traffic classes when that class is experiencing latency greater than a target (or at risk of experiencing latency greater than a target). Note that in some situations, available resources may be insufficient to provide target bandwidth and latency to prioritized classes (e.g., in high temperature scenarios). In some embodiments, control circuitry may generally prioritize RT traffic in one or more such scenarios, as discussed in detail below. In some embodiments, bulk traffic has neither a bandwidth nor latency quality-of-service priority.

In some embodiments, the requested bandwidth for the RT traffic may be an accumulation of bandwidth requests from one or more agent circuits. In some embodiments, agent circuits may include any circuit or element requesting bandwidth to perform a process, such as a graphics processor, I/O processor, central processing unit, display processor, etc., for example. Therefore, the memory access requests for RT traffic and LLT traffic include requests that may be used for various processing operations such as graphics processing, display processing, executing an operating system, executing third party applications, etc.

In some embodiments, memory controller circuitry 110 reads data from and writes data to storage circuitry 120 to perform requested memory access operations. Memory controller circuitry 110 may switch between read turns and write turns and may arbitrate among traffic classes for slots in a given turn, as discussed in detail below.

Allocation control circuitry 115, in the illustrated embodiment, is configured to allocate memory access operations among the RT traffic and LLT traffic according to an allocation policy. In some embodiments, based on detection of a first temperature scenario for the storage circuitry 120, memory controller circuitry 110 allocates memory access operations among RT traffic and LLT traffic according to a first allocation policy. In some embodiments, in response to detection of a second temperature scenario for the storage circuitry, memory controller circuitry 110 allocates memory access operations among RT traffic and LLT traffic according to a second allocation policy. In some embodiments, the second allocation policy provides greater bandwidth for RT traffic, relative to bandwidth requested by one or more agent circuits, than the first allocation policy. In some embodiments, memory controller 110 selects an allocation policy based on both a current temperature scenario and a current clock frequency of storage circuitry 120.

In some embodiments, different allocation policies use different transfer functions to provide bandwidth according to some multiplier of requested bandwidth, based on current operation conditions (e.g., current latency tolerance). Detailed example transfer functions are discussed below with reference to FIG. 3.

In the illustrated embodiment, storage circuitry 120 is configured to store data written by memory controller circuitry 110 and provide data for reads from memory controller circuitry 110. In some embodiments, storage circuitry 120 is configured to provide temperature data to memory controller circuitry 110. In some embodiments, storage circuitry 120 implements DRAM storage. Storage circuitry 120 is shown using dashed lines in FIG. 1 to indicate that disclosed memory controller circuitry may be manufactured and sold separately from storage circuitry 120, and may operate with storage circuitry of various technologies from various manufacturers.

In some embodiments, storage circuitry 120 provides a temperature value to memory controller circuitry 110, e.g., via a register in storage circuitry 120. In other embodiments, memory controller circuitry 110 may determine memory temperature using other techniques, e.g., using a temperature sensor physically located near storage circuitry 120. Note that in either case the temperature value may be an average across multiple temperature readings from one or more temperature sensors or the temperature value may be a maximum/minimum temperature reading captured from the one or more temperature sensors, for example. Further, the temperature value may be estimated or adjusted based on non-temperature information or temperature information from non-adjacent sensors.

Storage circuitry 120 may support multiple frequency states with different corresponding clock frequencies. For example, the multiple frequency states may correspond to all or a subset of the frequency states defined by the LPDDR5 standard or frequency states of some other standard. In some embodiments, memory control circuitry 110 (or some other circuitry such as power management circuitry) controls the frequency at which storage circuitry 120 operates.

Detailed Allocation Control Circuitry

Figure 2:
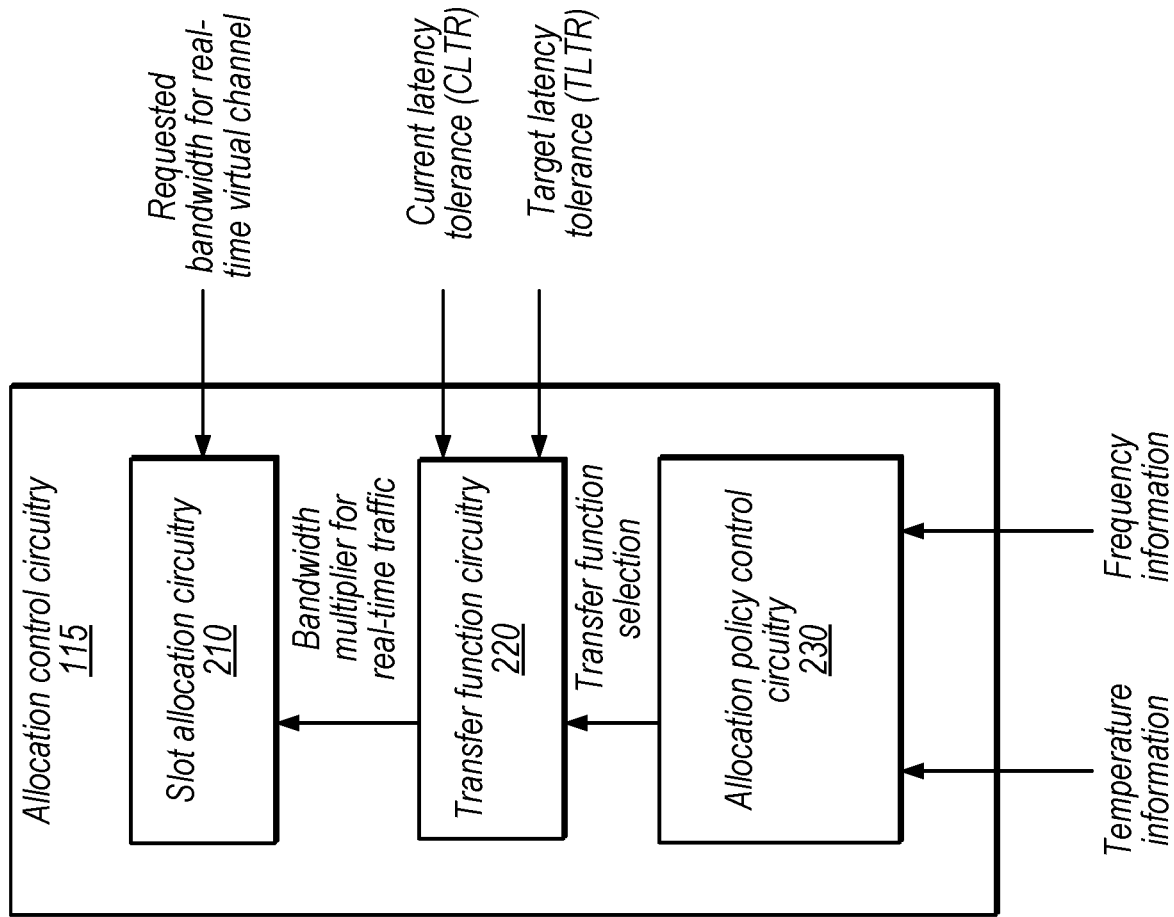
FIG. 2 is a block diagram illustrating detailed allocation control circuitry, according to some embodiments.

FIG. 2 is a block diagram illustrating detailed allocation control circuitry, according to some embodiments. In the illustrated embodiment, allocation control circuitry 115 includes slot allocation circuitry 210, transfer function circuitry 220, and allocation policy control circuitry 230.

Allocation policy control circuitry 230, in the illustrated embodiment, is configured to select a transfer function based on frequency information and temperature information for storage circuitry 120. For example, allocation policy control circuitry 230 may select a transfer function based on configuration information that maps a frequency/temperature scenario to a target transfer function from multiple available transfer functions. In some embodiments, thresholds for selecting different transfer functions and parameters of transfer functions are programmable, e.g., via configuration registers in memory controller circuitry 110. In some embodiments, the transfer functions for reads and writes may be set differently.

In other embodiments, allocation policy control circuitry 230 may select a transfer function based on only a portion of the illustrated inputs (e.g., based only on temperature information or only on frequency information) and may also consider additional inputs that are not shown.

In some embodiments, the transfer function establishes a relationship between one or more inputs and an output, and is used to determine a bandwidth multiplier value applied to requested bandwidth. For example, in various scenarios it may be desirable to provide real-time traffic more bandwidth than it requests, e.g., in order to allow it to get ahead or catch up, when possible. In some embodiments, a given transfer function includes an adjustment factor parameter that corresponds to a temperature/frequency scenario. Selecting a transfer function may correspond to selecting a value for this adjustment factor.

The adjustment factor may be determined based on expected DRAM timings for a given set of operating conditions, such as the percentage of RT traffic bandwidth loss at a particular temperature, whether the traffic is reads or writes, and operating frequency, for example.

In the illustrated embodiment, transfer function circuitry 220 is configured to calculate a bandwidth multiplier for real-time traffic based on a determined transfer function and adjustment factor, e.g., based on input from allocation policy control circuitry 230. In some embodiments, transfer function circuitry 220 also receives the following inputs: a current latency tolerance (which may be abbreviated as CLTR) and a target latency tolerance (which may be abbreviated as TLTR).

In some embodiments, the CLTR may be based on reports from one or more agent circuits who send requests. In some embodiments, only RT requesters send CLTR reports. These agents may determine and report their buffer status (e.g., time to overflow/underflow), which may indicate whether or not they requested enough bandwidth for their workload and/or whether their requested bandwidth is being satisfied. In other embodiments, CLTR may be aggregated or separately maintained for multiple different virtual channels. In the illustrated embodiment, a single CLTR is maintained (which may be determined based on reports from multiple agents), but this information may be determined, maintained, and used on a per-agent basis in other embodiments. In some embodiments, the requested bandwidth for the RT virtual channel may be based on the aggregated bandwidth requested from one or more agent circuits (e.g., RT requesters). In some embodiments, separate CLTR values, TLTR values, and requested bandwidths may be maintained for reads and writes.

Speaking generally, a higher CLTR (e.g., near the TLTR) may indicate that RT traffic is receiving the bandwidth it needs while a low CLTR may indicate that RT traffic is at risk (e.g., of buffer overflow/underflow).

In some embodiments, the bandwidth multiplier represents the amount of bandwidth to be allocated to the RT virtual channel (e.g., at the expense of other virtual channels). In some embodiments, the bandwidth multiplier may be used to adjust a number of slots per turn allocated to RT traffic, for example. A "turn" refers to a set of consecutive read accesses before a write access or a set of write accesses before a read access, although note that a turn may be interrupted before completing the set of planned consecutive accesses.

As used herein, a "slot" refers to a time interval in which the memory is to be accessed, and slots may be assigned to different virtual channels within a given read or write turn. For example, a slot may correspond to the amount of time needed to read or write (transfer) 64 bytes of data. The number of slots per turn for each virtual channel may be determined based on various criteria while the actual requests serviced in different slots may be determined by an arbitration circuit.

In the illustrated embodiment, slot allocation circuitry 210 is configured to allocate a number of slots per turn for RT traffic. Note that the number of slots allocated to real-time traffic may increase based on increases to the bandwidth multiplier.

In some embodiments, slots are allocated in a read turn for storage circuitry 120 according to a current allocation policy (e.g., bandwidth multiplier) of the first and second allocation policies. In some embodiments, a greater temperature value of storage circuitry 120 corresponds to a greater portion of a given read turn being used for refresh operations for the storage circuitry.

Example Allocation Policy Transfer Functions

In some embodiments, memory controller circuitry 110 is configured to allocate slots for memory access to one or more virtual channels based on requested bandwidth and a determined bandwidth multiplier. In some embodiments, the bandwidth multiplier is determined based on CLTR, TLTR, temperature, and frequency.

Figure 3:
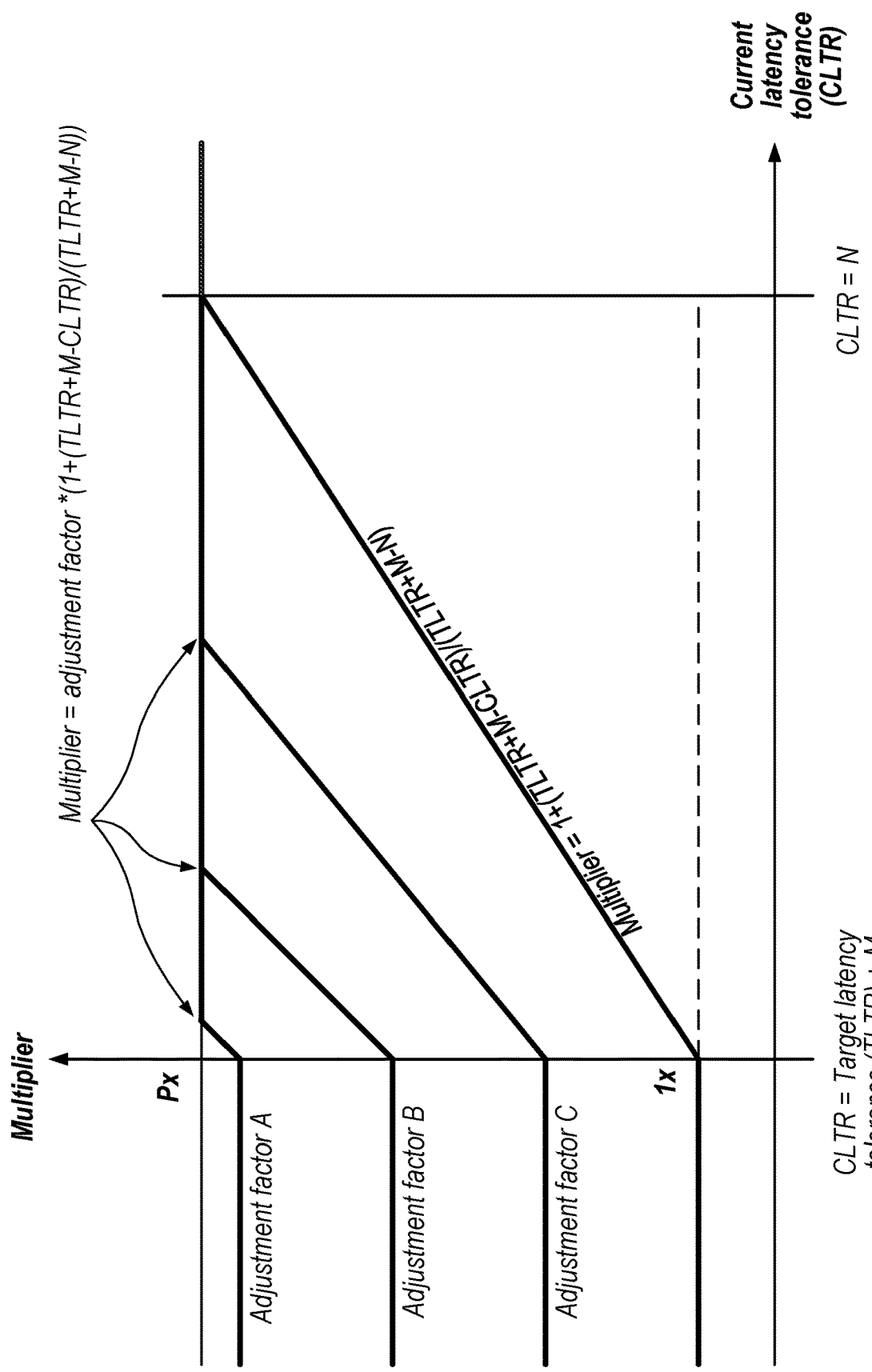
FIG. 3 is a diagram illustrating examples of transfer functions for assigning bandwidth to real-time traffic based on temperature, frequency, and latency tolerance, according to some embodiments.

FIG. 3 is a diagram illustrating examples of transfer functions for assigning bandwidth to real-time traffic based on temperature, frequency, and latency tolerance, according to some embodiments. Although the disclosed functions are discussed in the context of slot allocation, the disclosed techniques may be used to allocate bandwidth using other mechanisms, in other embodiments.

In the illustrated embodiment, four example transfer functions are shown. As discussed above, the memory controller circuitry 110 may select one of the illustrated transfer functions based on current temperature conditions.

As a first example, for the bottom-most transfer function, RT traffic receives its requested bandwidth multiplied by a 1x bandwidth multiplier until the CLTR falls below the TLTR plus the value M (e.g., indicated by the intersection of the left-most vertical line with the bottom-most horizontal line). The value M may ensure that the CLTR will pass the target latency tolerance during catch-up, and may be determined as a percentage of the TLTR. In the illustrated embodiment, the bandwidth multiplier then ramps to Px (where P is a positive, maximum value) until the CLTR reaches the value N (e.g., indicated by the intersection of the right-most vertical line and bottom-most horizontal line), which may be fixed or may be related to the TLTR. As illustrated for the three other example transfer functions, RT traffic receives a bandwidth multiplier between 1x and Px based on a selected transfer function and corresponding adjustment factor A-C. Note that the exemplary 1x and Px multipliers are shown for purposes of illustration, but any of various multipliers may be used. In some embodiments, Px may correspond to a limit for real-time traffic.

In the illustrated embodiment, the equation of the ramp-up is: bandwidth multiplier=adjustment factor * (1+(TLTR+M−CLTR)/(TLTR+M−N)). For the lower-most illustrated function, the adjustment factor may be equal to one and the equation of the ramp reduces to: bandwidth multiplier=1+(TLTR+M−CLTR)/(TLTR+M−N). In some embodiments, the determined multiplier may be programmed into a register. In some embodiments, the determined multiplier may be frequency, temperature, and direction (read vs. write) specific.

In some embodiments, after RT slots are determined, memory controller circuitry 110 may assign remaining slots to the LLT virtual channel. If slots remain after LLT allocations, the remaining slots may be assigned to bulk traffic.

In some embodiments, in addition to assigning bandwidth to the RT virtual channel, memory controller circuitry 110 is configured to provide a guarantee of forward progress for one or more groups of traffic. For example, after determining a bandwidth multiplier using a selected transfer function and allocating a corrected number of slots to RT traffic, RT traffic may crowd out other channels. Thus, memory controller circuitry 110 may allocate a threshold number of slots to LLT and/or bulk traffic before determining allocations for RT. This may avoid situations where RT starves other traffic for extended periods.

In some embodiments, using the CLTR, temperature, and frequency-based transfer functions to assign slots during a turn, discussed in detail above, may allow memory controller circuitry to provide sufficient bandwidth to real-time traffic, even when temperatures are high (although this may occur at the expense of slots for other types of traffic).

Example Method

Figure 4:
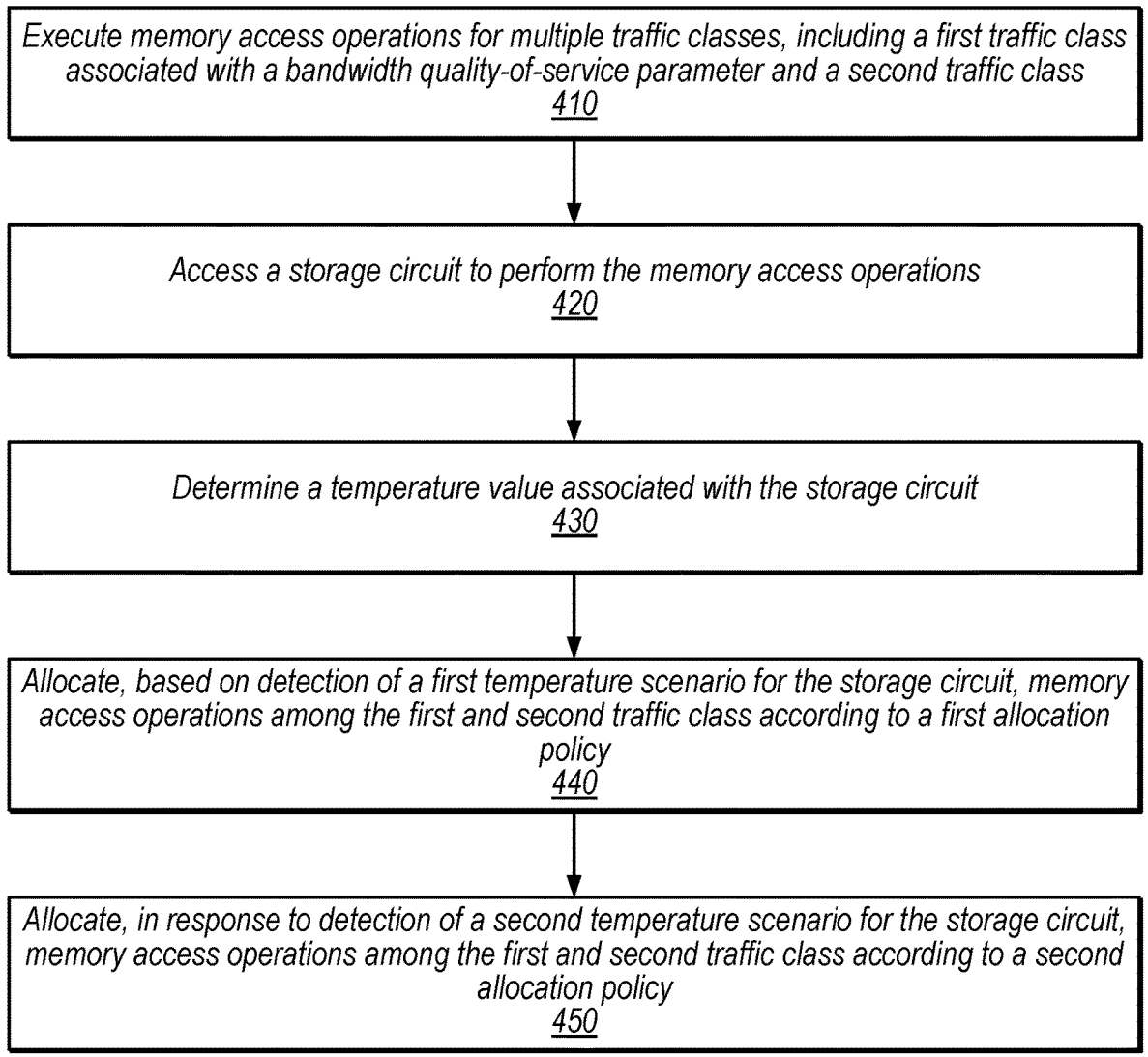
FIG. 4 is a flow diagram illustrating an example method for real-time traffic bandwidth compensation at high temperatures, according to some embodiments.

FIG. 4 is a flow diagram illustrating an example method for real-time traffic bandwidth compensation at high temperatures, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a processor circuit executes memory access operations for multiple traffic classes, including a first traffic class associated with a bandwidth quality-of-service parameter and a second traffic class.

In some embodiments, the first traffic class is real-time (RT) traffic and the second traffic class is low-latency traffic (LLT). In some embodiments, LLT has a latency quality-of-service priority.

At 420, in the illustrated embodiment, a memory controller accesses a storage circuit to perform the memory access operations.

At 430, in the illustrated embodiment, the memory controller receives a temperature value associated with the storage circuit.

In some embodiments, the temperature value represents a current temperature of the storage circuit (e.g., DRAM) in a current operating scenario. In some embodiments, the temperature value may be stored in a register, or any other electronic storage medium capable of storing numerical values, of the storage circuit. In some embodiments, the temperature value is used to select a transfer function for bandwidth multiplier determination.

At 440, in the illustrated embodiment, the memory controller allocates, based on detection of a first temperature scenario for the storage circuit, memory access operations among the first and second traffic class according to a first allocation policy.

In some embodiments, the first temperature scenario includes the temperature value associated with the storage circuit meeting a threshold temperature.

At 450, in the illustrated embodiment, the memory controller allocates, in response to detection of a second temperature scenario for the storage circuit, memory access operations among the first and second traffic class according to a second allocation policy.

In some embodiments, the second allocation policy provides greater bandwidth for the first traffic class, relative to bandwidth requested by one or more agent circuits, than the first allocation policy.

In some embodiments, the memory controller allocates slots in a read turn for the storage circuit according to a current allocation policy of the first and second allocation policies, where a greater temperature value for the storage circuit corresponds to a greater portion of a given read turn being used for refresh operations for the storage circuit. In some embodiments, the memory controller allocates slots in a write turn for the storage circuitry according to a current allocation policy of the first and second allocation policies, where a greater temperature value for the storage circuit corresponds to a greater portion of a given write turn being used for refresh operations for the storage circuit.

In some embodiments, the memory controller determines a bandwidth multiplier value according to a transfer function that uses latency tolerance as an input parameter, and applies the bandwidth multiplier value to requested bandwidth for the first traffic class to provide a greater amount of bandwidth than requested over an interval.

In some embodiments, the latency tolerance (e.g., current latency tolerance (CLTR)) is based on buffer status reported by one or more requesting agent circuits.

In some embodiments, the memory controller uses different transfer functions for different allocation policies corresponding to different temperature scenarios.

In some embodiments, at least one of the different transfer functions provides a greater amount of bandwidth than requested for the first traffic class in a scenario where the latency tolerance is below a target latency tolerance (TLTR).

In some embodiments, the memory controller allocates memory access operations among the first and second traffic classes according to at least three allocation policies corresponding to different temperature scenarios.

In some embodiments, in addition to temperature, the memory controller selects an allocation policy based on a current clock frequency of the storage circuit.

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). Note that sequential circuitry may perform operations on a rising edge of a clock signal, a falling edge of a clock signal, or both (which may be referred to as dual-edge triggered).

Example Device

Figure 5:
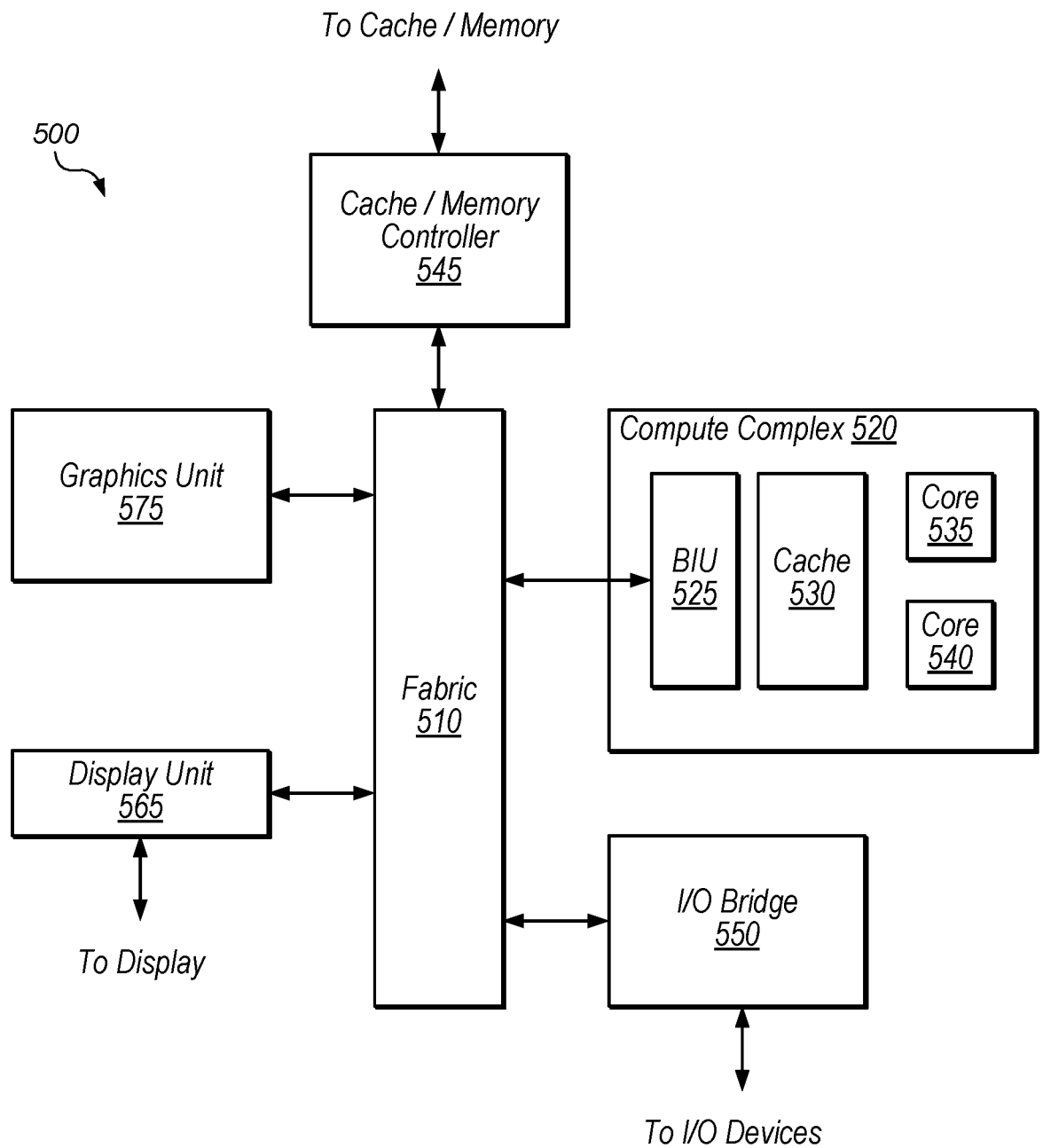
FIG. 5 is a block diagram illustrating an example computing device, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 575, and display unit 565. In some embodiments, device 500 may include other components (not shown) in addition to or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. In some embodiments, fabric 510 may be configured to support multiple virtual channels including a real-time (RT) virtual channel, a low-latency virtual channel, and a bulk (or best-effort) virtual channel, as discussed above with reference to FIGS. 1-3.

In the illustrated embodiment, compute complex 520 includes bus interface unit (BIU) 525, cache 530, and cores 535 and 540. In various embodiments, compute complex 520 may include various numbers of processors, processor cores and caches. For example, compute complex 520 may include 1, 2, or 4 processor cores, or any other suitable number. In one embodiment, cache 530 is a set associative L2 cache. In some embodiments, cores 535 and 540 may include internal instruction and data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches. In some embodiments, cache/memory controller 545 is configured to perform the high temperature bandwidth compensation techniques discussed above with reference to FIGS. 1-3.

As used herein, the term "coupled to" may indicate one or more connections between elements, and a coupling may include intervening elements. For example, in FIG. 5, graphics unit 575 may be described as "coupled to" a memory through fabric 510 and cache/memory controller 545. In contrast, in the illustrated embodiment of FIG. 5, graphics unit 575 is "directly coupled" to fabric 510 because there are no intervening elements.

Graphics unit 575 may include one or more processors, e.g., one or more graphics processing units (GPU's). Graphics unit 575 may receive graphics-oriented instructions, such as OPENGL®, Metal, or DIRECT3D® instructions, for example. Graphics unit 575 may execute specialized GPU instructions or perform other operations based on the received graphics-oriented instructions. Graphics unit 575 may generally be configured to process large blocks of data in parallel and may build images in a frame buffer for output to a display, which may be included in the device or may be a separate device. Graphics unit 575 may include transform, lighting, triangle, and rendering engines in one or more graphics processing pipelines. Graphics unit 575 may output pixel information for display images. Graphics unit 575, in various embodiments, may include programmable shader circuitry which may include highly parallel execution cores configured to execute graphics programs, which may include pixel tasks, vertex tasks, and compute tasks (which may or may not be graphics-related).

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and low-power always-on functionality, for example. I/O bridge 550 may also include interfaces such as pulse-width modulation (PWM), general-purpose input/output (GPIO), serial peripheral interface (SPI), and inter-integrated circuit (12C), for example. Various types of peripherals and devices may be coupled to device 500 via I/O bridge 550.

In some embodiments, device 500 includes network interface circuitry (not explicitly shown), which may be connected to fabric 510 or I/O bridge 550. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 500 with connectivity to various types of other devices and networks.

Example Applications

Figure 6:
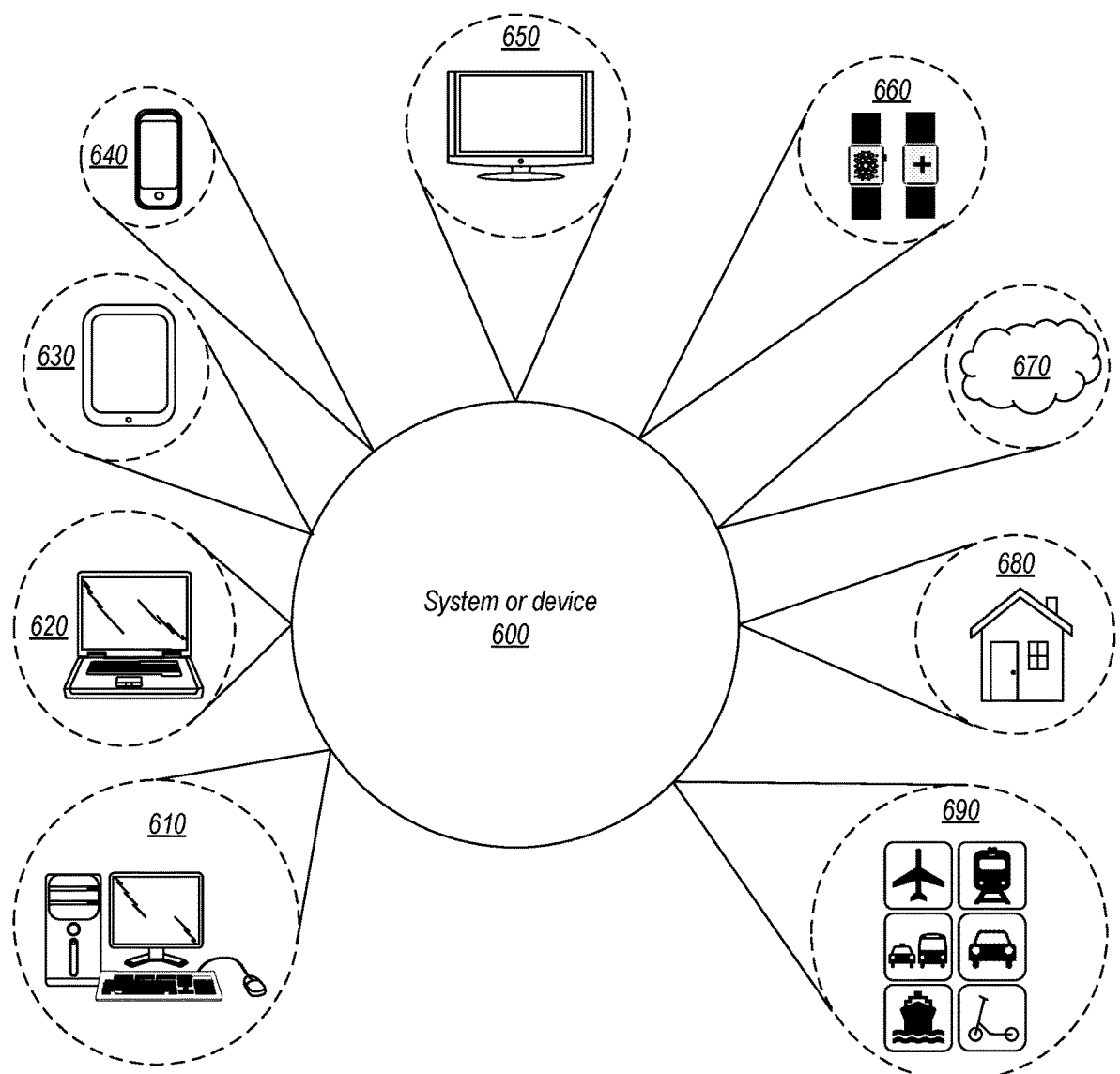
FIG. 6 is a diagram illustrating example applications of disclosed systems and devices, according to some embodiments.

Turning now to FIG. 6, various types of systems that may include any of the circuits, devices, or system discussed above. System or device 600, which may incorporate or otherwise utilize one or more of the techniques described herein, may be utilized in a wide range of areas. For example, system or device 600 may be utilized as part of the hardware of systems such as a desktop computer 610, laptop computer 620, tablet computer 630, cellular or mobile phone 640, or television 650 (or set-top box coupled to a television).

Similarly, disclosed elements may be utilized in a wearable device 660, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 600 may also be used in various other contexts. For example, system or device 600 may be utilized in the context of a server computer system, such as a dedicated server or on shared hardware that implements a cloud-based service 670. Still further, system or device 600 may be implemented in a wide range of specialized everyday devices, including devices 680 commonly found in the home such as refrigerators, thermostats, security cameras, etc. The interconnection of such devices is often referred to as the "Internet of Things" (IoT). Elements may also be implemented in various modes of transportation. For example, system or device 600 could be employed in the control systems, guidance systems, entertainment systems, etc. of various types of vehicles 690.

The applications illustrated in FIG. 6 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
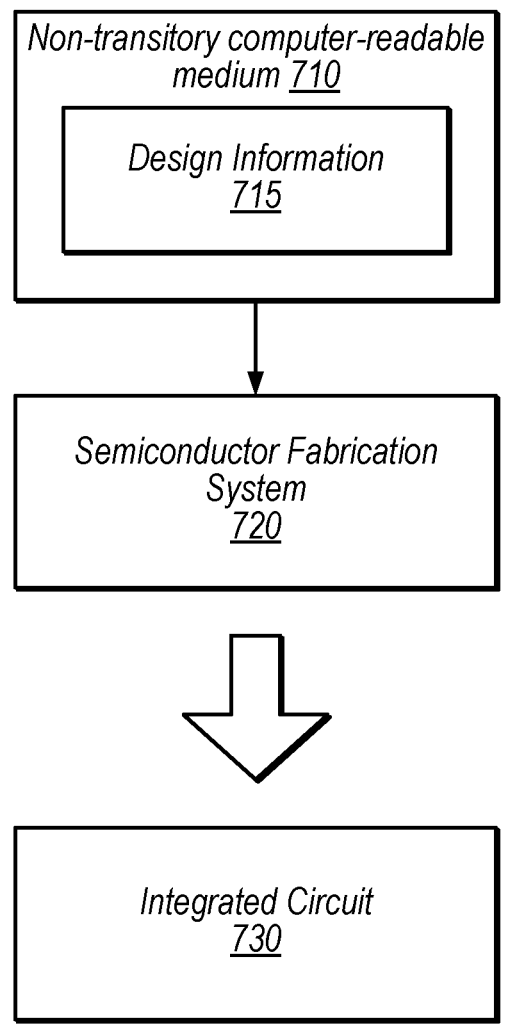
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, System Verilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis, layout, or both of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1 and 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
processor circuitry configured to execute memory access operations for multiple traffic classes, including a first traffic class associated with a bandwidth quality-of-service parameter and a second traffic class;
memory controller circuitry configured to:
access storage circuitry to perform the memory access operations;
determine a temperature value associated with the storage circuitry;
based on detection of a first temperature scenario for the storage circuitry, allocate memory access operations among the first and second traffic class according to a first allocation policy, wherein the first allocation policy provides bandwidth to the first traffic class as a first multiple of bandwidth requested by an agent circuit for the first traffic class; and in response to detection of a second temperature scenario for the storage circuitry, allocate memory access operations among the first and second traffic class according to a second allocation policy, wherein the second allocation policy provides bandwidth to the first traffic class as a second, greater multiple of bandwidth requested by the agent circuit for the first traffic class.

2. The apparatus of claim 1, wherein the memory controller circuitry is configured to allocate slots in a read turn for the storage circuitry according to a current allocation policy of the first and second allocation policies, wherein a greater temperature value for the storage circuitry corresponds to a greater portion of a given read turn being used for refresh operations for the storage circuitry.

3. The apparatus of claim 1, wherein the second temperature scenario includes the temperature value associated with the storage circuitry meeting a threshold temperature.

4. The apparatus of claim 1, wherein the memory controller circuitry is further configured to:
   determine the first and second multiples according to a transfer function that uses latency tolerance as an input parameter; and
   apply the second multiple to requested bandwidth for the first traffic class to provide a greater amount of bandwidth, over an interval, than requested by the agent circuit.

5. The apparatus of claim 4, wherein the memory controller circuitry is further configured to use different transfer functions for different allocation policies corresponding to different temperature scenarios.

6. The apparatus of claim 4, wherein the latency tolerance is based on buffer status reported by one or more requesting agent circuits.

7. The apparatus of claim 6, wherein the memory controller circuitry is configured provide the greater amount of bandwidth in a scenario where the latency tolerance is below a target latency tolerance.

8. The apparatus of claim 1, wherein the memory controller circuitry is configured to allocate memory access operations among the first and second traffic classes according to at least three allocation policies corresponding to different temperature scenarios.

9. The apparatus of claim 1, wherein the memory controller circuitry is further configured to select an allocation policy based on a current clock frequency of the storage circuitry.

10. The apparatus of claim 1, wherein the apparatus is a computing device that further includes:
   the storage circuitry;
   a display;
   a central processing unit; and
   network interface circuitry.

11. A method, comprising:
   executing, by a processor circuit, memory access operations for multiple traffic classes, including a first traffic class associated with a bandwidth quality-of-service parameter and a second traffic class;
   accessing, by a memory controller, a storage circuit to perform the memory access operations;
   determining, by the memory controller, a temperature value associated with the storage circuit;
   allocating, based on detection of a first temperature scenario for the storage circuit, memory access operations among the first and second traffic class according to a first allocation policy, wherein the first allocation policy provides bandwidth to the first traffic class as a first multiple of bandwidth requested by an agent circuit for the first traffic class; and
   allocating, in response to detection of a second temperature scenario for the storage circuit, memory access operations among the first and second traffic class according to a second allocation policy, wherein the second allocation policy provides bandwidth to the first traffic class as a second, greater multiple of bandwidth requested by the agent circuit for the first traffic class.

12. The method of claim 11, further comprising:
   allocating, by the memory controller, slots in a read turn for the storage circuit according to a current allocation policy of the first and second allocation policies, wherein a greater temperature value for the storage circuit corresponds to a greater portion of a given read turn being used for refresh operations for the storage circuit.

13. The method of claim 11, further comprising:
   determining, by the memory controller, the first and second multiples according to a transfer function that uses latency tolerance as an input parameter; and
   applying, by the memory controller, the second multiple to requested bandwidth for the first traffic class to provide a greater amount of bandwidth, over an interval, than requested by the agent circuit.

14. The method of claim 11, further comprising:
   allocating, by the memory controller, memory access operations among the first and second traffic classes according to at least three allocation policies corresponding to different temperature scenarios.

15. The method of claim 11, further comprising:
   selecting, by the memory controller, an allocation policy based on a current clock frequency of the storage circuit.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
   processor circuitry configured to execute memory access operations for multiple traffic classes, including a first traffic class associated with a bandwidth quality-of-service parameter and a second traffic class;
   memory controller circuitry configured to:
      access storage circuitry for memory access operations;
      determine a temperature value associated with the storage circuitry;
      based on detection of a first temperature scenario for the storage circuitry, allocate memory access operations among the first and second traffic class according to a first allocation policy, wherein the first allocation policy provides bandwidth to the first traffic class as a first multiple of bandwidth requested by an agent circuit for the first traffic class; and
      in response to detection of a second temperature scenario for the storage circuitry, allocate memory access operations among the first and second traffic class according to a second allocation policy, wherein the second allocation policy provides bandwidth to the first traffic class as a second, greater multiple of bandwidth requested by the agent circuit for the first traffic class.

17. The non-transitory computer readable storage medium of claim 16, wherein the memory controller circuitry is configured to allocate slots in a read turn for the storage circuitry according to a current allocation policy of the first and second allocation policies, wherein a greater temperature value for the storage circuitry corresponds to a greater portion of a given read turn being used for refresh operations for the storage circuitry.

18. The non-transitory computer readable storage medium of claim 16, wherein the second temperature scenario includes the temperature value associated with the storage circuitry meeting a threshold temperature.

19. The non-transitory computer readable storage medium of claim 16, wherein the memory controller circuitry is further configured to:
   determine the first and second multiples according to a transfer function that uses latency tolerance as an input parameter; and
   apply the second multiple to requested bandwidth for the first traffic class to provide a greater amount of bandwidth, over an interval, than requested by the agent circuit.

20. The non-transitory computer readable storage medium of claim 19, wherein the memory controller circuitry is further configured to use different transfer functions for different allocation policies corresponding to different temperature scenarios.

* * * * *